June 1, 1954     D. R. DE BOISBLANC     2,679,746
DETONATION ANALYZER

Filed Oct. 31, 1949                         2 Sheets-Sheet 1

INVENTOR.
D. R. DE BOISBLANC
BY Hudson & Young

ATTORNEYS

INVENTOR.
D. R. DE BOISBLANC
BY Hudson & Young
ATTORNEYS

Patented June 1, 1954

2,679,746

UNITED STATES PATENT OFFICE 2,679,746

DETONATION ANALYZER

Deslonde R. de Boisblanc, Bartlesville, Okla., assignor to Phillips Petroleum Company, a corporation of Delaware Application October 31, 1949, Serial No. 124,667

6 Claims. (Cl. 73—35)

This invention relates to a detonation analyzer for indicating the instant at which detonation occurs during each operating cycle of a piston in an internal combustion engine.

When an internal combustion engine is operating normally without the occurrence of any detonation in the cylinders thereof, the curve rate of change of pressure in the cylinder to time resembles a single cycle of a damped sinusoidal wave, this wave hereafter being referred to as the main pressure wave. When detonation occurs in the cylinder, a high frequency component is superimposed upon the damped sinusoidal wave a short interval after the first maximum or peak thereof. Detonation meters heretofore utilized in the prior art separate this high frequency component representative of detonation from the low frequency sinuosidal component and from other high frequency components of the pressure wave, such as those resulting from valve closure, operation of the injector in certain airplane engines, and occurrence of the ignition spark. After amplification, the signal representative of detonation is measured and its amplitude is considered to be proportional to the intensity of detonation.

I have found that the measurement of detonation intensity made by this method does not, in all cases, give reliable quantative results. As previously noted, the high frequency detonation component is superimposed upon the damped sinusoidal main pressure wave and occurs slightly after the first maximum or peak thereof. Accordingly, shifting of the detonation signal along the time axis of the sinusoidal wave produces an apparent variation in the intensity of detonation, since the amplitude of the sinusoidal wave is continuously decreasing with time after the maximum value has been reached. That is, a detonation component superimposed upon the main pressure wave at a region near its peak will give a substantially higher reading on the detonation meter than a detonation component of equal intensity superimposed upon a declining portion of the sinuosoidal wave where the amplitude of the sinusoidal wave is less than its peak amplitude.

This shifting of the detonation component along the time axis may produce a false reading of detonation both with electronic detonation meters, such as those approved by the ASTM, and in the older bouncing pin type of measurement. The shifting may occur as a result of occurrence of detonation at different regions of the cylinder. It will be apparent that the greater the distance of the region of detonation from the detonation pickup, the further will the detonation component be displaced along the time axis of the sinusoidal main pressure wave.

In accordance with this invention, I produce a timing pulse at a predetermined part of the cycle of the piston in the cylinder at which the detonation measurements are taken, and the time interval between each timing pulse and a pulse representing the instant of detonation is measured to provide a voltage which is proportional to the shift of the detonation component along the time axis. This voltage may be applied to the output voltage of an electronic detonation meter to provide a correction for the shift of the detonation component along the time axis or, alternatively, the comparison voltage may be utilized to determine whether or not a test engine is in proper condition for determining the detonation characteristics of its fuels.

It is an object of the invention to provide a detonation analyzer for determining the time at which detonation occurs during each operating cycle of a cylinder under test.

It is a further object to provide an analyzer which is of simple construction, rugged in operation, and utilizes a minimum number of standard circuit components.

Various other objects, advantages and features of the invention will become apparent from the following description, taken in conjunction with the accompanying drawings, in which.

Figure 1:
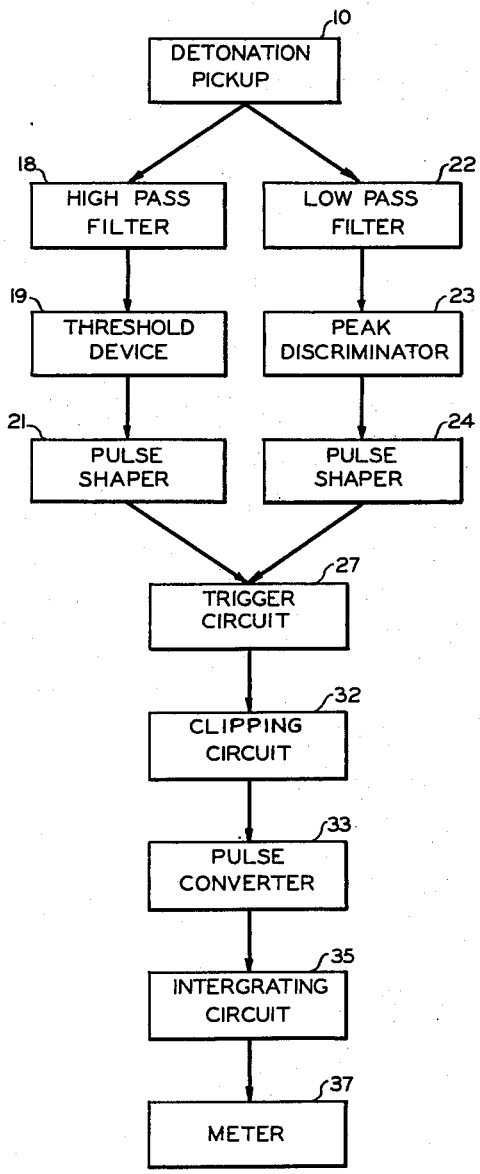
Figure 1 is a block diagram of the detonation analyzer.
Figure 2:
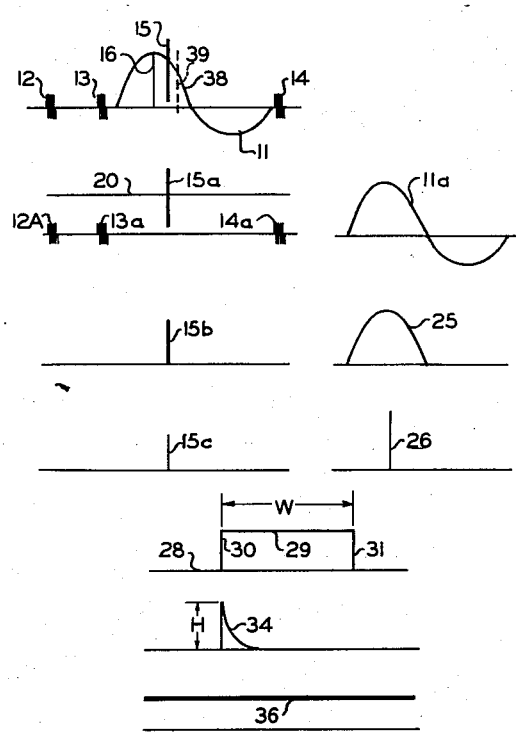
Figure 2 is a series of graphs illustrating the wave form at various parts of the instrument of Figure 1.

Referring now to the drawings in detail, and particularly to Figure 1, a detonation pickup 10 is mounted upon the cylinder of an internal combustion engine which is to be tested, this pickup operating in a known manner to convert pressure variations in the cylinder into electrical voltages representative thereof. As shown by Figure 2, the voltage wave produced by the pickup includes a damped sinusoidal component 11 representative of the main pressure wave in the cylinder together with high frequency components 12, 13 and 14 representing valve actuation and the ignition spark. When detonation occurs in the cylinder, a high frequency component 15 is superimposed upon pressure wave 11. In the example shown, detonation component 15 occurs a short interval after the main pressure wave 11 reaches its maximum amplitude at 16. As previously stated, under certain conditions of engine operation, detonation component 15 may shift laterally along the time axis with a resultant change in the length of the interval between peak amplitude 16 of the main pressure wave and detonation component 15. It is this interval which is measured by the apparatus of this invention. As will become apparent from the following description, the occurrence of the ignition spark, as indicated by high frequency component 13, in some cases, may also be used as a reference for measuring the displacement of detonation component 15 along the time axis under some conditions.

In the circuit of Figure 1, the output of the pickup 10 is fed to a high pass filter 18 which passes detonation component 15. In Figure 2, it will be noted that the wave form at the output of filter 18 includes filtered detonation component 15a and high frequency components 12a, 13a and 14a corresponding to the components 12, 13 and 14. It will further be noted that the main pressure wave 11, which is of low frequency, is rejected by filter 18 and does not appear at the output thereof. The output of filter 18 is then fed to a threshold device 19 which passes only components of greater than a predetermined amplitude, as indicated by horizontal line 20, Figure 2. As a result, the output of threshold device 19 consists only of a high frequency wave 15b representative of the detonation component 15. This pulse is fed from threshold device 19 to a pulse shaper 21 where it is converted into a single sharp pulse 15c which occurs, during each cycle, at the precise instant of detonation. A suitable detailed circuit corresponding to the elements of the block diagram thus far described is shown in my U. S. Patent 2,448,323, entitled "Detonation Meter."

In accordance with the invention, the output of the pickup 10 is also fed through a low pass filter 22, a peak discriminator 23, and a pulse shaper 24 to produce a timing pulse which occurs at a predetermined part of each operating cycle. In this embodiment of the invention, the timing pulse is produced as the main pressure wave 11, Figure 2, reaches its maximum value. To this end, low pass filter 22 is selectively tuned to the frequency of main pressure wave 11 so that the output thereof consists of a damped sinusoidal wave 11a corresponding to the main pressure wave 11, the high frequency components 12, 13, 14, and 15 being eliminated by the action of the filter. The peak discriminator 23 converts wave 11a into a rectified pulse 25 which is not of sufficient sharpness as to produce an accurate timing signal. Thereupon, the pulse shaper 24 converts pulse 25 into a sharp timing pulse 26 which occurs at the instant main pressure wave 11 reaches its maximum value. The individual circuits of filter 22, peak discriminator 23 and pulse shaper 24 are well known and, hence, need not be described in detail herein, the invention residing in the combination of these circuits to produce new results.

The outputs of pulse shapers 21 and 24 are fed to a trigger circuit 27, which may be of the type colloquially referred to as a "flip-flop" circuit. This circuit has two stable limiting conditions with an unstable region therebetween and the circuit is changed alternately to its two stable conditions by the successive pulses produced by circuits 21 and 24. In particular, referring to Figure 2, the circuit 27 is stable when the anode circuit of one of its tubes is at the voltage represented by line 28 or at the voltage represented by line 29 while it is unstable at anode voltages represented by the portion of the graph between lines 28 and 29. As a result, the incidence of pulse 15c upon the trigger circuit produces a sudden increase, represented by line 30, in the anode voltage and, thereafter, the incidence of pulse 26 upon the circuit produces a sudden decrease in anode voltage, as represented by line 31. It will be apparent, therefore, that the output of trigger circuit 27 is a rectangular wave whose width W is proportional to the time interval between pulses 15c and 26. In the circuit, as described, the interval measured is that between the detonation component 15 of one cycle of operation and the maximum amplitude 16 of the pressure wave of the next succeeding cycle of operation. By a simple adjustment of the circuit, the interval between the maximum amplitude 16 and the detonation component 15 of the same cycle of engine operation may be measured.

The rectangular waves produced by trigger circuit 27 are fed to a clipping circuit 32 which passes only voltages between predetermined amplitude limits, thereby to eliminate variations in amplitude of the rectangular waves. The modified rectangular waves from circuit 32 are fed to a pulse converter circuit 33 which produces a pulse 34 corresponding to each rectangular wave, the height H of pulse 34 being proportional to the width W of the corresponding rectangular wave. This circuit, in effect, amplifies the width variations of the rectangular waves and provides a wave form which is more readily acted upon by an integrating circuit 35 which is fed by the output of pulse converter 33. The circuit 35 produces a voltage wave 36, the amplitude of which is proportional to the average height H of pulses 34, and to the average width W of the rectangular waves produced by the trigger circuit over a number of operating cycles. Accordingly, the integrated wave form 36 has an amplitude proportional to the average time interval between pulses 15c and 26 over a number of operating cycles which, in turn, is proportional to the average displacement of detonation component 15 along the time axis from peak amplitude 16 of the wave 11. The integrated output of the circuit 35 is fed to a meter 37 which may be either a conventional milliammeter or a vacuum tube voltmeter.

As previously mentioned, if detonation component 15 occurs at the peak portion 16 of the main pressure wave, its apparent amplitude is greater than if the detonation component is shifted rightwardly along the time axis so that it is superimposed upon a region of the curve 11, such as that indicated at 38. In order to illustrate this point more clearly, a detonation component 39 has been shown superposed upon the curve 11 at the region 38 thereof. It will be evident that the apparent amplitude of component 39 is less than that of component 15 although, in fact, both components are of the same amplitude. Measurement of the time interval between detonation component 15 and a predetermined region of the operating curve, such as peak amplitude 16, permits the effect of the shifting of detonation component 15 along the time axis to be readily compensated for.

Thus, the output of the described analyzer may either be mixed with the output of an electronic detonation meter as a correction voltage, or a test engine may be operated until a stable condition is obtained wherein detonation occurs during or at a predetermined part of each operating cycle. Thereupon, the output of the detonation meter is proportional in a quantitative manner to the intensity of detonation.

Figure 3:
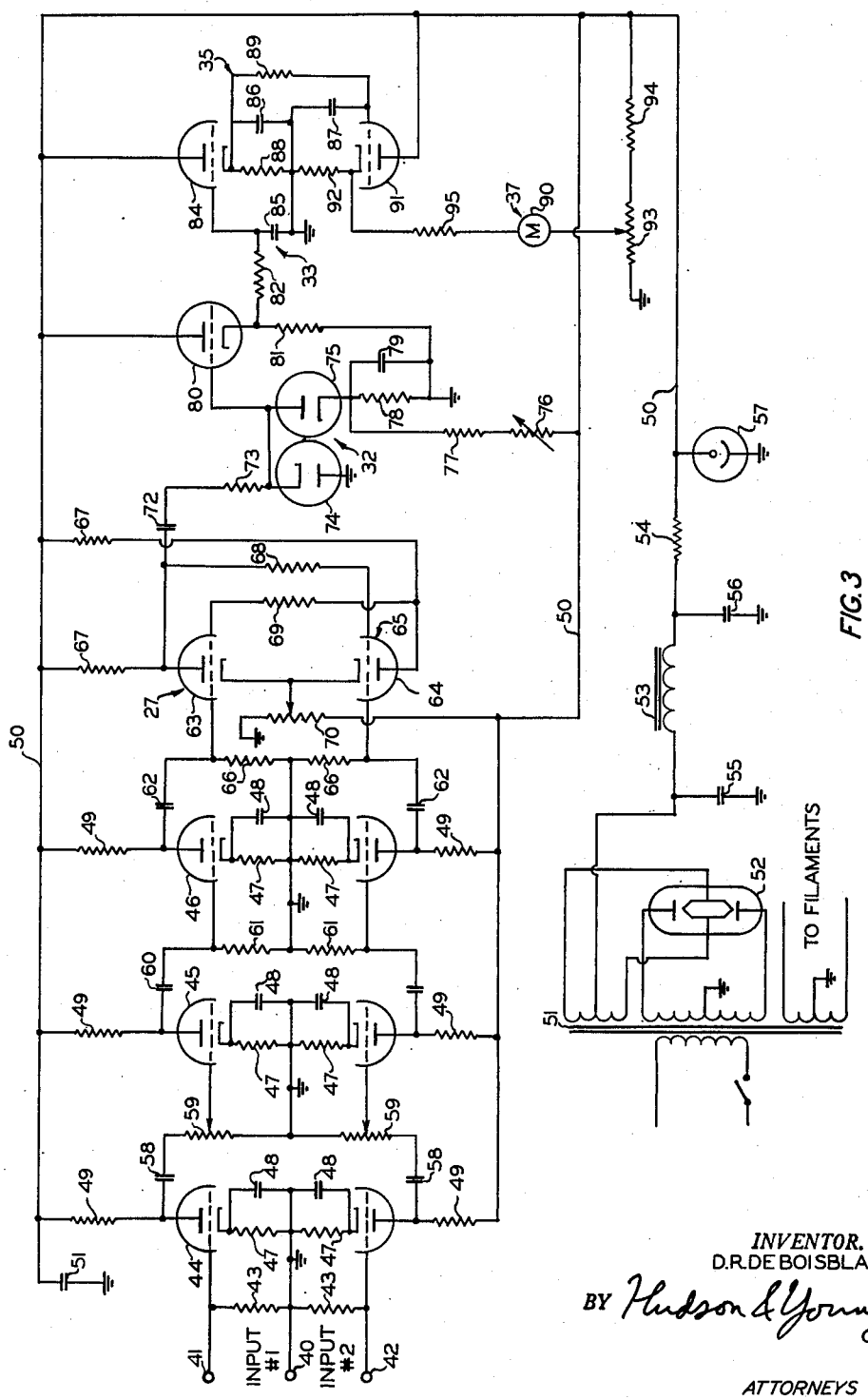
Figure 3 is a schematic circuit diagram of a portion of the circuit of Figure 1.

The detailed circuit of unit 27 and subsequent units is shown by Figure 3, in which the output of pulse shaper 21 is fed to input terminals 40, 41 and the output of pulse shaper 24 is fed to input terminals 40 and 42. Each set of input terminals is shunted by a grid resistor 43 and the respective terminals 41, 42 are connected to the control grids of the first stage tubes of two separate audio amplifiers, each amplifier including one section of three dual triode tubes 44, 45 and 46. The cathode of each triode section is connected to ground through a bias resistor 47 shunted by a by-pass condenser 48, the anode of each tube being connected through a decoupling resistor 49 to a positive power supply conductor 50 having a grounded by-pass condenser 51 attached thereto. The conductor 50 is supplied with current in the usual manner by a power pack including a power transformer 51, a dual diode rectifier tube 52, a filter inductance 53, a resistor 54, by-pass condensers 55, 56 and a voltage regulator tube 57. The anodes of dual triode 44 are connected through coupling condensers 58, respectively, to grounded potentiometers 59, the sliders of which are connected to the respective control grids of dual triode 45. The anodes of dual triode 45, in turn, are connected through coupling condensers 60, respectively, to the control grids of dual triode 46, each control grid having a grounded grid resistor 61 connected in circuit therewith. Accordingly, the dual triodes 44, 45 and 46 comprise two separate three stage amplifiers, each of which amplifies the output voltage of one of the pulse shapers 21 or 24, the amplifier gain being controlled individually by potentiometers 59.

The anodes of dual triode 46 are connected through coupling condensers 62, respectively, to the control grids of sections 63, 64 of a dual triode 65, each of said control grids having a grounded grid resistor 66 connected in circuit therewith. Tube 65 and its associated components constitute the trigger circuit 27 of Figure 1. The anodes of dual triode 65 are connected to positive power supply conductor 50 through the respective decoupling resistors 67, and the anode of triode section 63 is connected to the control grid of triode section 64 by a resistor 68, while the anode of triode section 64 is connected to the control grid of triode section 63 by a resistor 69. The cathodes of the dual triode 65 are interconnected and are supplied with operating potential from a voltage divider 70.

Due to the cross connection of the control grids and anodes of triode sections 63, 64 by resistors 68 and 69, the circuit has two stable limiting conditions with a region of unstability therebetween. In one stable condition, tube 63 is conductive while tube 64 is non-conductive and in the other stable condition tube 64 is conductive while tube 63 is non-conductive, the circuit being changed from one stable position to another by application of a negative voltage pulse to the control grid of the conductive tube. Assuming that tube 64 is non-conductive and tube 63 is conductive, application of a detonation pulse to terminals 40, 41 from pulse shaper 21 causes tube 63 to become non-conductive with the result that the anode voltage of tube 63 rises suddenly and tube 64 becomes conductive due to the resultant increase in its control grid voltage. Thereupon, application of a timing pulse to terminals 40, 42 from pulse shaper 24 causes tube 64 to become non-conductive with the result that tube 63 becomes conductive and its anode potential decreases abruptly to its original value. Thus, a rectangular wave is produced at the anode of tube 63 whose width is proportional to the time interval between the detonation pulse and the timing pulse, as set forth in connection with the description of the block diagram, Figure 1.

The rectangular waves from trigger circuit 27 are then passed through a condenser 72 and a resistor 73 to clipping circuit 32 which consists of a diode 74 having its anode grounded and its cathode connected to the adjacent terminal of resistor 73 together with a diode 75 having its anode connected to the adjacent terminal of resistor 73 and its cathode connected to a voltage divider network including a variable resistor 76, and fixed resistors 77 and 78, resistor 78 being shunted by a by-pass condenser 79. Diode 74 by-passes to ground components having less than a predetermined voltage while diode 75 by-passes components having a voltage greater than a predetermined maximum value. Accordingly, the clipping circuit 32 confines the amplitude of rectangular waves 29, Figure 2, within predetermined amplitude limits.

The output of clipping circuit 32 is fed to the control grid of a triode 80 having its anode connected to conductor 50 and its cathode connected to ground through a resistor 81. The output from the cathode of this tube is fed to pulse converter circuit 33 through a resistor 82 which is connected to the control grid of a triode 84 and to ground through a condenser 85. When a rectangular wave is fed to condenser 85, the condenser charges in an exponential manner to produce a voltage pulse whose amplitude is proportional to the width of the rectangular wave fed thereto, the resultant pulse of variable amplitude being fed to tube 84 which has its anode connected to lead 50 and its cathode connected to an integrating circuit comprising accumulating condensers 86, 87 and resistances 88, 89, these components making up the integrating circuit 35 of Figure 1. The output of the integrating circuit is a voltage wave whose amplitude is proportional to the amplitude of the pulses fed thereto by converter circuit 33 over a number of operating cycles. Hence, the integrated voltage is also proportional to the width of pulses 29 over a number of operating cycles, to the average time interval between each pair of timing pulses and detonation pulses, and to the amount of shifting of detonation component 15, Figure 2, along the time axis from maximum amplitude of peak portion 16 of the voltage wave 11. This integrated voltage is fed to a meter 90 through a triode 91 having its anode connected to conductor 50, and having its cathode connected to ground through a resistor 92. The meter 90 has one terminal thereof connected to a voltage divider network formed by a variable resistor 93 and a fixed resistor 94, while the other terminal is connected through a resistor 95 to the cathode of tube 91. Accordingly, the meter 90 reads the integrated output voltage produced by the circuit 35.

Figure 4:
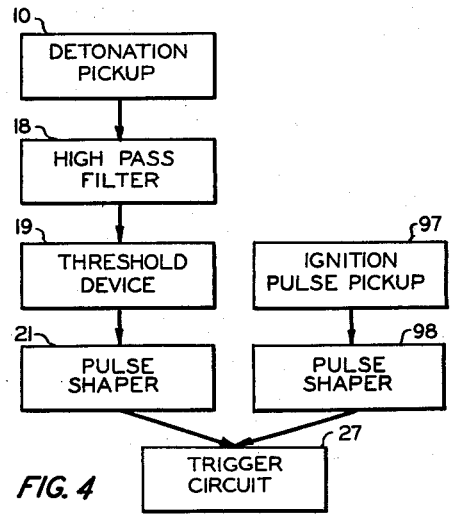
Figure 4 is a block diagram of a modification of the invention.

In Figure 4, I have shown a modification of the circuit of this invention wherein the timing pulse is derived from the ignition system, rather than from a peak discriminator responsive to the peak value of the main pressure wave. This circuit includes a detonation pickup 10, high pass filter 18, threshold device 19, pulse shaper 21, and trigger circuit 27 similar to those already described in connection with Figures 1, 2 and 3. In this circuit, the filter 22, peak discriminator 23, and pulse shaper 24 are replaced by an ignition pulse pickup 97 which produces a voltage pulse at the instant ignition occurs in the cylinder under test. A suitable circuit for producing such a pulse is shown in U. S. Patent 2,291,045 to J. H. Lancor, Jr., entitled "Synchronizing Arrangement for Detonation Detectors." The pulses produced by pickup 97 are fed to a pulse shaper 98 which produces a sharp timing pulse at the instant of ignition, this timing pulse being fed to the trigger circuit 27 in the manner described in connection with Figure 1, such as by connecting the pulse shaper output to the terminals 40, 42 of Figure 3. In this case, the output of the analyzer is proportional to the average time interval between ignition and the occurrence of detonation over a number of operating cycles. The use of the ignition impulse as a time reference for the measurement of the detonation interval is very satisfactory since ignition always occurs at a predetermined part of the operating cycle. Hence, it will be apparent that the output of the circuit of Figure 4 may be utilized to determine when a test engine is in proper condition for the rating of fuels.

While the invention has been described in connection with a present, preferred embodiment thereof, it is to be understood that this description is illustrative only and is not intended to limit the invention, the scope of which is defined by the appended claims.

Having described my invention, I claim:

1. A detonation analyzer comprising, in combination, a pickup for converting pressure variations in a cylinder of an internal combustion engine into electrical voltages representative thereof, means fed by said pickup for producing a sharp pulse of electric current at the instant of detonation, a circuit for producing a sharp timing pulse at a predetermined time during each cycle of the piston in said cylinder, a trigger circuit having two stable positions, means for feeding the detonation pulses to said trigger circuit so that each pulse initiates a rectangular wave in the trigger circuit, means for feeding said timing pulses to said trigger circuit to terminate each rectangular wave, a clipping circuit fed by said trigger circuit to limit the amplitude of said rectangular waves within predetermined limits, an integrating circuit fed by said clipping circuit to provide a voltage representative of the average width of said pulses over a number of operating cycles, and a meter fed by said integrating circuit.

2. A detonation analyzer comprising, in combination, a pickup for converting pressure variations in a cylinder of an internal combustion engine into electrical voltages representative thereof, means fed by said pickup for producing a sharp pulse of electric current at the instant of detonation, a circuit for producing a sharp timing pulse at a predetermined time during each cycle of the piston in said cylinder, a trigger circuit having two stable positions, means for feeding the detonation pulses to said trigger circuit so that each pulse initiates a rectangular wave in the trigger circuit, means for feeding said timing pulses to said trigger circuit to terminate each rectangular wave, a clipping circuit fed by said trigger circuit to limit the amplitude of said rectangular waves within predetermined limits, a pulse converter unit for transforming said rectangular pulses into pulses whose amplitude is proportional to the width of the rectangular pulse, an intergrating circuit for producing a voltage representative of the average amplitude of the converted pulses and the average width of the rectangular waves over a number of operating cycles, and a meter fed by said integrating circuit.

3. In a detonation analyzer, in combination, a pickup for converting pressure variations in a cylinder of an internal combustion engine into electrical voltages representative thereof, a filter selectively tuned to voltage components representative of detonation, a threshold device fed by said filter for eliminating components of less than a predetermined magnitude, said threshold device producing a sharp voltage pulse each time detonation occurs in said cylinder, means for transmitting a voltage from the ignition system of said engine which is representative of spark ignition in said cylinder, said voltage thereby producing a sharp timing pulse at a predetermined period in the cycle of the piston in said cylinder, a trigger circuit having two stable positions, means for feeding the detonation pulses to said trigger circuit so that each pulse initiates a rectangular wave in the trigger circuit, means for feeding said timing pulses to said trigger circuit to terminate each rectangular wave, a clipping circuit fed by said trigger circuit to limit the amplitude of said rectangular waves within predetermined limits, a pulse converter circuit for transforming said rectangular pulses into pulses whose amplitude is proportional to the width of the rectangular pulse, an integrating circuit for producing a voltage representative of the average amplitude of the converted pulses and the average width of the rectangular waves over a number of operating cycles, and a meter fed by said integrating circuit.

4. In a detonation analyzer, in combination, a pickup for converting pressure variations in a cylinder of an internal combustion engine into electrical voltages representative thereof, said voltages including components representative of detonation and a component representative of the main pressure wave in said cylinder, a filter fed by said pickup and selectively tuned to the components representative of detonation, a threshold device fed by said filter for eliminating components of less than a predetermined amplitude whereby said threshold device produces a sharp pulse each time detonation occurs in said cylinder, a second filter fed by said pickup and selectively tuned to the frequency of said main pressure wave, a peak discriminator circuit fed by said second filter to produce a pulse when said main pressure wave reaches a maximum amplitude, means for sharpening the pulses produced by said discriminator circuit, thereby to produce a timing pulse during each cycle of the piston in said cylinder when the main pressure wave reaches its maximum amplitude, and means for producing an electrical voltage proportional to the average time interval between said pulses over a number of cycles.

5. In a detonation analyzer, in combination, a pickup for converting pressure variations in a cylinder of an internal combustion engine into electrical voltages representative thereof, said voltages including components representative of detonation and a component representative of the main pressure wave in said cylinder, a filter fed by said pickup and selectively tuned to the components representative of detonation, a threshold device by said filter for eliminating components of less than a predetermined amplitude, whereby said threshold device produces a sharp pulse each time detonation occurs in said cylinder, a second filter fed by said pickup and selectively tuned to the frequency of said main pressure wave, a peak discriminator circuit fed by said second filter to produce a pulse when said main pressure wave reaches a maximum amplitude, means for sharpening the pulses produced by said discriminator circuit, thereby to produce a timing pulse during each cycle of the piston in said cylinder when the main pressure waves reaches its maximum amplitude, a trigger circuit having two stable positions, means for feeding the detonation pulses to said trigger circuit so that each pulse initiates a rectangular wave in the trigger circuit, means for feeding said timing pulses to said trigger circuit to terminate each rectangular wave, and means for measuring the average width of said rectangular waves over a number of operating cycles.

6. In a detonation analyzer, in combination, a pickup for converting pressure variations in a cylinder of an internal combustion engine into electrical voltages representative thereof, said voltages including components representative of detonation and a component representative of the main pressure wave in said cylinder, a filter fed by said pickup and selectively tuned to the components representative of detonation, a threshold device fed by said filter for eliminating components of less than a predetermined amplitude whereby said threshold device produces a sharp pulse each time detonation occurs in said cylinder, a second filter fed by said pickup and selectively tuned to the frequency of said main pressure wave, a peak discriminator circuit fed by said second filter to produce a pulse when said main pressure wave reaches a maximum amplitude, means for sharpening the pulses produced by said discriminator circuit, thereby to produce a timing pulse during each cycle of the piston in said cylinder when the main pressure wave reaches its maximum amplitude, a trigger circuit having two stable positions, means for feeding the detonation pulses to said trigger circuit so that each pulse initiates a rectangular wave in the trigger circuit, means for feeding said timing pulses to said trigger circuit to terminate each rectangular wave, a clipping circuit fed by said trigger circuit to limit the amplitude of said rectangular waves within predetermined limits, a pulse converter circuit for transforming said rectangular pulses into pulses whose amplitude is proportional to the width of the rectangular pulse, an integrating circuit for producing a voltage representative of the average amplitude of the converted pulses and the average width of the rectangular waves over a number of operating cycles, and a meter fed by said integrating circuit.

References Cited in the file of this patent

UNITED STATES PATENTS

| Number | Name | Date |
| --- | --- | --- |
| 2,225,381 | Van Dijck | Dec. 17, 1940 |
| 2,291,045 | Lancor | July 28, 1942 |
| 2,370,692 | Shepherd | Mar. 6, 1945 |
| 2,448,323 | DeBoisblanc | Aug. 31, 1948 |
| 2,485,584 | Ginzton | Oct. 25, 1949 |
| 2,518,427 | Lindberg et al. | Aug. 8, 1950 |